United States Patent [19]

Forrest et al.

[11] Patent Number: 4,756,590
[45] Date of Patent: Jul. 12, 1988

[54] OPTICAL COMPONENT PACKAGE

[75] Inventors: Stephen R. Forrest, Chatham; Yusuke Ota, Mountain Lakes, both of N.J.

[73] Assignee: American Telephone and Telegraph Company, AT&T Bell Laboratories, Murray Hill, N.J.

[21] Appl. No.: 771,785

[22] Filed: Sep. 3, 1985

[51] Int. Cl.⁴ .................................................. G02B 5/14
[52] U.S. Cl. .................................. 350/96.15; 350/96.16
[58] Field of Search ............... 350/96.15, 96.16, 96.19, 350/96.20

[56] References Cited

U.S. PATENT DOCUMENTS

| 4,130,343 | 12/1978 | Miller et al. | 350/96.15 |
| 4,165,496 | 8/1979 | Di Domenico, Jr. et al. | 350/96.15 X |
| 4,647,152 | 3/1987 | Jeskey | 350/96.24 |
| 4,650,280 | 3/1987 | Sedlmayr | 350/96.27 |

OTHER PUBLICATIONS

C. M. Miller, "Fiber–Optic Array Splicing with Etched Silicon Chips," *The Bell System Technical Journal*, vol. 57, No. 1, Jan. 1978, pp. 75–90.
M. G. Brown et al, "Fully Optical and Electrically Interfaced, Monolithic 1×12 Array of $In_{0.53}Ga_{0.47}As$-/InP p-i-n Photodiodes," *Proceedings of International Electron Devices Meeting*, 1984, pp. 727–728.
P. P. Deimel et al, "Electrical and Optical Integration of a Monolithic 1×12 array of InGaAsP/Inp ($\lambda = 1.3$-$\mu$m) Light-Emitting Diodes," *Conference on Optical Fiber Communications Technical Digest*, San Diego, Calif., Feb. 11–14, 1985, p. 32.

*Primary Examiner*—Eugene R. LaRoche
*Assistant Examiner*—Steven J. Mottola
*Attorney, Agent, or Firm*—Lester H. Birnbaum

[57] ABSTRACT

Disclosed is an optical package including at least one electro-optical component aligned with at least one optical fiber. The electro-optical component is mounted on a surface which is essentially parallel to, but not coplanar with, the longitudinal axis of the fiber and light is coupled between the fiber and component by bending the light path. Electrical connection to the component is provided by conductors mounted over the same surface, thus producing a compact package. The invention is used preferably with arrays of components and fibers to eliminate the need for a vertical fanout to contact the components.

10 Claims, 4 Drawing Sheets

OPTICAL COMPONENT PACKAGE

BACKGROUND OF THE INVENTION

This invention relates to optical component packages, and in particular to a package including electro-optical components aligned with optical fibers.

With the expanding use of lightwave components for computer data transmission, workers in the field are now investigating arrays of light-emitting devices and photoresponsive devices for increasing the capacity of optical data links. In a typical package, an array of fibers is provided in grooves etched in blocks of silicon. The electro-optical components, such as p-i-n photodiodes or light-emitting diodes, are mounted at the end (vertical) surface of the block so that each is aligned with its associated fiber. Electrical connection to the array is provided by a fanout of conductors on the vertical surface electrically coupled to a fanout of conductors on the horizontal surface of a separate body such as alumina mounted adjacent to the silicon body. The horizontal fanout extends to the edges of the separate body where pins are attached for electrical connection to external circuitry such as a printed wiring board. The silicon block, electro-optic array, and conductor fanouts are typically protected by a metal container.

While such packages have proved satisfactory, they are fairly large, typically measuring approximately 1.5 inches long, 0.5 inches high, and 0.75 inches wide, and require an excessive number of components. Further, metal packaging techniques do not enjoy the economies of standard integrated circuit packaging. In addition, the performance of larger packages is often degraded due to parasitic capacitances, resistances and inductances incurred by long lead lengths necessary to connect the optical device to the package pin-out.

It is, therefore, an object of the invention to provide a compact optical component package. It is a further object of the invention to employ integrated circuit packaging techniques for optical packages.

SUMMARY OF THE INVENTION

These and other objects are achieved in accordance with the invention which is an optical component package comprising at least one optical fiber and at least one electro-optical component aligned with said fiber. The component is mounted on a surface which is essentially parallel to the longitudinal axis of the fiber. Means are provided for reflecting light between the component and the fiber.

BRIEF DESCRIPTION OF THE DRAWING

These and other features of the invention are delineated in detail in the following description. In the drawing.

It will be appreciated that for purposes of illustration, these Figures are not necessarily drawn to scale.

DETAILED DESCRIPTION

Figure 1:
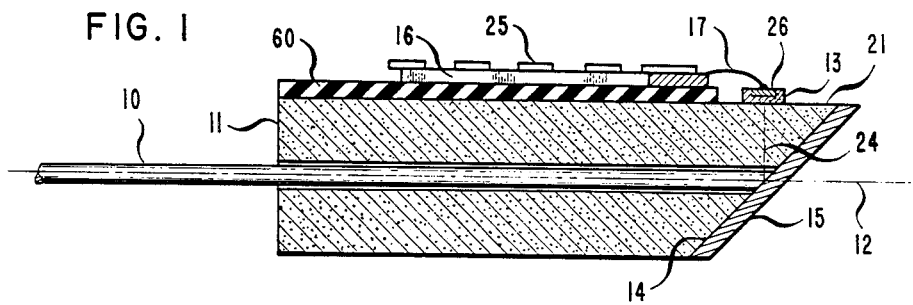
FIG. 1 is a cross-sectional, partly schematic, view of an optical component package in one stage of fabrication in accordance with one embodiment of the invention.
Figure 2:
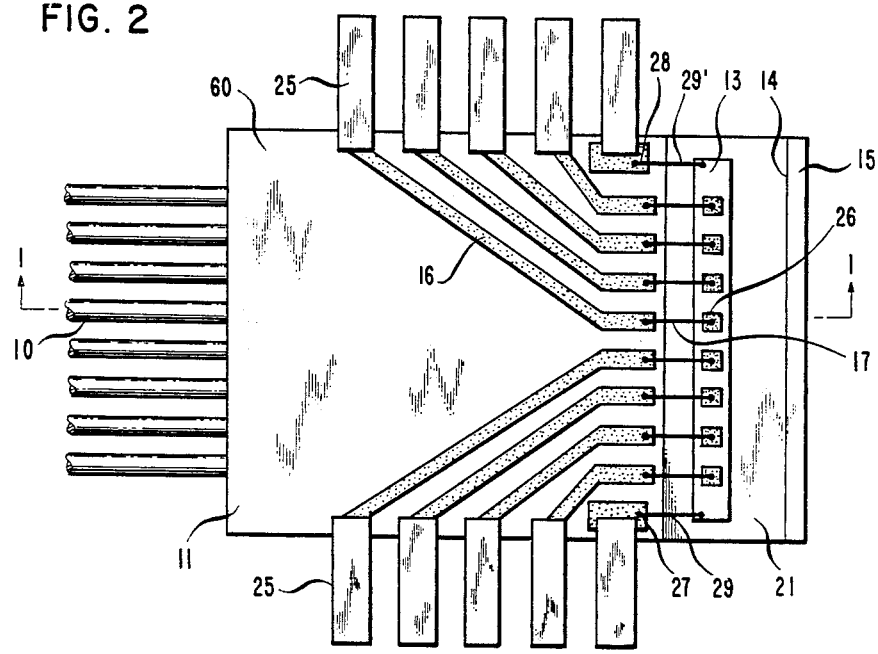
FIG. 2 is a plan view of the package of FIG. 1.

The basic principles of the invention will be described with reference to FIGS. 1 and 2, which are cross-sectional and plan views, respectively, of a package prior to final encapsulation (FIG. 1 is taken along line 1-1' of FIG. 2). An array of optical fibers, such as 10, is mounted in essentially a single plane within a block, 11, comprising silicon. Although not apparent in these views, the fibers are mounted within V-shaped grooves etched in the surfaces of two silicon blocks which are bonded together as known in the art. (See, for example, C. M. Miller, *Bell System Technical Journal*, Vol. 57, page 75 (1978) and FIG. 6 of this application.) The longitudinal axis of the fiber, 10, is illustrated as dashed line 12.

The electro-optical components in this example are a plurality of p-i-n photodiodes formed in a simple block 13, which comprises an n+ type InP substrate upon which are formed successive layers of InP and n-type InGaAs. The diodes are formed by diffusion of Zn into the surface of the block to form individual p-type regions illustrated, for example, as region 26 (the other layers of the photodiode array are not shown for the sake of clarity in the illustration). For an example of a p-i-n array, see M. G. Brown et al, "Fully Optical and Electrically Interfaced, Monolithic 1×12 Array of $In_{0.53}Ga_{0.47}As/InP$ p-i-n Photodiodes," *Proceedings of International Electron Devices Meeting*, 1984, pp. 727-728. The components were mounted in the top surface, 21, of the silicon block near one end using transparent epoxy (not shown). As illustrated, this top surface is parallel to the longitudinal axes of the fibers.

Alternatively, the components could be integrated into the top surface of the silicon block. Further, the components could be other standard photoresponsive devices, or light-emitting devices such as lasers or light-emitting diodes. Each component is positioned so as to either receive light from, or transmit light to, an associated fiber depending on whether the component is a photoresponsive or light-emitting device. It will be also be appreciated that eight photodiodes are shown primarily for illustrative purposes and any number of components could be used.

Light is transmitted between a fiber and its associated component by including a reflective surface 15 in the light path. In this example, the reflective surface is formed by grinding and polishing the end of the silicon block which will be closest to the components to form a surface, 14, which makes an angle of approximately 45 degrees with the top surface of the block. (Since the block is preferably shaped after the fibers are mounted in the silicon block, the fiber ends will also be ground and polished as shown.) A reflective layer, 15, which in this example was aluminum, was then deposited on the beveled surface by standard evaporation techniques. In this example, the thickness of the layer was approximately 2000 Angstroms. The reflective layer causes the light from the fiber (or from the component) to be bent approximately 90 degrees so that the light will be incident on its associated component (or the associated fiber) even though the component is mounted parallel to and above the fiber. The light path between the component and fiber core is indicated by dashed line 24.

Each component was electrically coupled by means of a wire, such as 17, extending from a p-type region to one of the conductors, 16, of a fanout array of conductors, as most easily seen in the plan view of FIG. 2. In this example, the conductors were multilayers of titanium, platinum and gold with thicknesses of 100 Angstroms each of titanium and platinum and 5000 Angstroms of gold. Any bondable conductor material should be appropriate. The conductors were formed by standard vacuum evaporation (on a piece of ceramic, 60, which was glued to the surface 21 of the silicon block). Electrical contact to the n-type region of the array was provided through pads 27 and 28, also comprising titanium, platinum, and gold, formed near the edges of the silicon block on ceramic 60, and wire contacts 29 and 29'. Attached to pads (not shown) at the end of each conductor, such as 16, and to each n-type contact pad, 27 and 28, was a gold-plated pin, such as 25, which extends over the edge of the silicon block. External electrical connection is provided to the components via the pins extending from the package which are bent downward as shown in the perspective view of FIG. 3.

Figure 3:
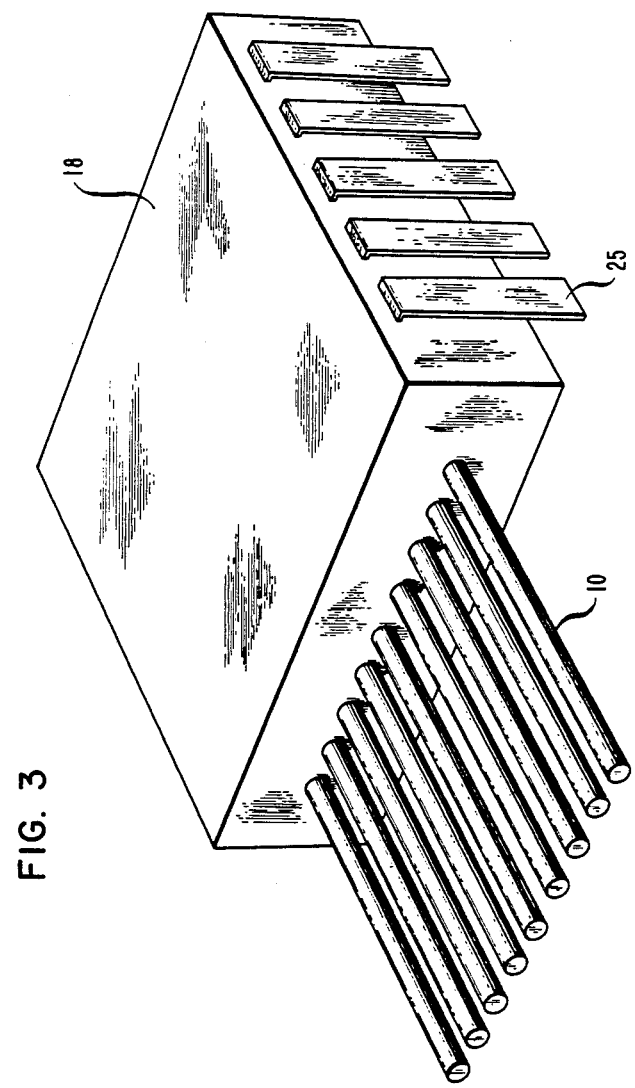
FIG. 3 is a perspective view of the final component package in accordance with the embodiments of FIGS. 1 and 2.

It will be noted in FIG. 3 that a protective encapsulant, 18, has been formed by standard epoxy molding around the elements shown in FIGS. 1 and 2 to complete the package. This encapsulant can be the standard material used for encapsulation of integrated circuit chips, such as thermoplastic resins or epoxies. It will also be noted that the package closely resembles a standard dual-in-line (DIP) package used for integrated circuit chips. In this particular example, the package (not including the pins) measured approximately 0.3 inches wide, 0.25 inches high, and 0.72 inches long, a substantial reduction in size over prior metal casing packages.

Figure 4:
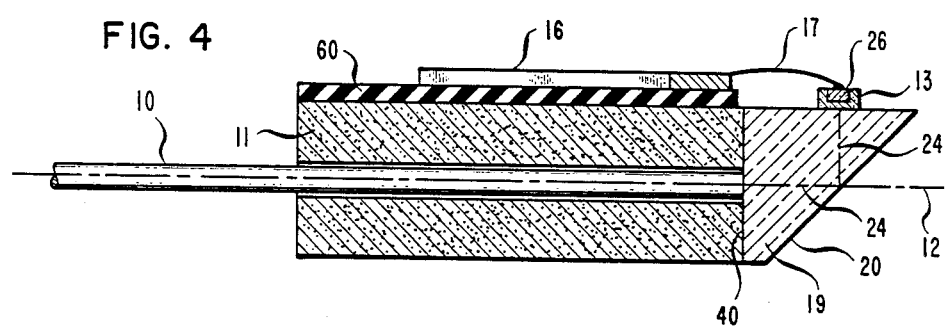
FIG. 4 is a cross-sectional, partly schematic, view of an optical component package in one stage of fabrication in accordance with a further embodiment of the invention.

An alternative embodiment to that of FIGS. 1 and 2 is illustrated in FIG. 4, where the same elements are similarly numbered. Here, rather than grinding and polishing the surface of the block, 11, at a 45 degree angle, a right angle glass prism, 19, is attached thereto by, for example, epoxy bonding. The components, such as the photodiode represented by 13 and 26, are then mounted on the top surface of the prism so that light will be coupled between the components and fibers by reflection at the surface, 20, of the prism, which bends the light path approximately 90 degrees. This embodiment could result in some optical coupling loss due to spreading of the light beam at the surface, 40, at the prism as it exits the fiber. This loss would not be significant when large area p-i-n detectors are used. (It will be noted that in the Figure, the pins, 25, are omitted for the sake of clarity.)

Figure 5:
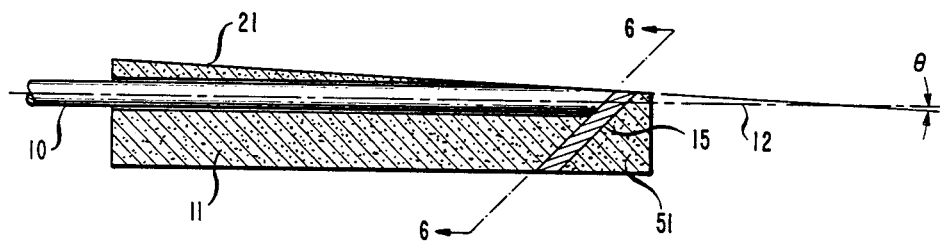
FIG. 5 is a cross-sectional, partly schematic, view of an optical component package in one stage of fabrication in accordance with a still further embodiment of the invention.
Figure 6:
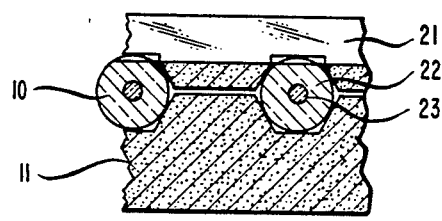
FIG. 6 is an end view of the optical package in FIG. 5.

A further embodiment of the invention is illustrated in the cross-sectional view of FIG. 5 and the cross-sectional end view of FIG. 6. Again, the same elements are similarly numbered. It will be noted that in this embodiment, the top surface, 21, of the silicon block, 11, has been ground and polished so as to expose the top surface of the fibers at the edge where the light will be reflected by layer 15, to maximize optical coupling efficiency between the device and the fiber. It will be noted that the silicon block, 11, also includes a block, 51, which can also be silicon, attached to the reflecting layer 15. This latter block can serve as a protective piece when surface 21 is ground and polished to expose the fiber. Otherwise, the beveled surface including the fiber ends and reflective layer, 15, might break.

FIG. 6 is a cross-sectional view (with layer 15 and block 51 removed) along line 6—6 of FIG. 5 showing two of the fibers of the array. Each standard fiber is shown with a cladding layer, 22, and a core, 23, through which the light travels. It will be therefore be apparent that light exiting the cores of the fibers will still be reflected by layer 15, but will only have to travel through the upper portion of the cladding before being incident on the electro-optical components mounted over each fiber. (The components and the fanout, which are mounted on surface, 21, and the top of the exposed fibers, are omitted in FIGS. 5 and 6 for the sake of clarity in the illustration.) This structure should reduce optical loss, and also allow easier alignment of each component since the fibers are clearly visible at the ends.

It should be appreciated that the angle, $\theta$, that the polished top surface, 21, makes with the fiber axis, 12, is highly exaggerated in this Figure. The angle would usually be in the range 0.5–1 degree. This small angle is desirable because the tops of the fibers are preferably polished along with the surface of the silicon. If the tops of the fibers are polished at too great an angle, the light from the core will be refracted on emerging from the fiber, and alignment with the components becomes difficult, if not impossible. It will therefore be understood that the term "essentially parallel" in describing the relation of surface 21 to the fiber axis is intended to include angles up to 5 degrees.

Figure 7:
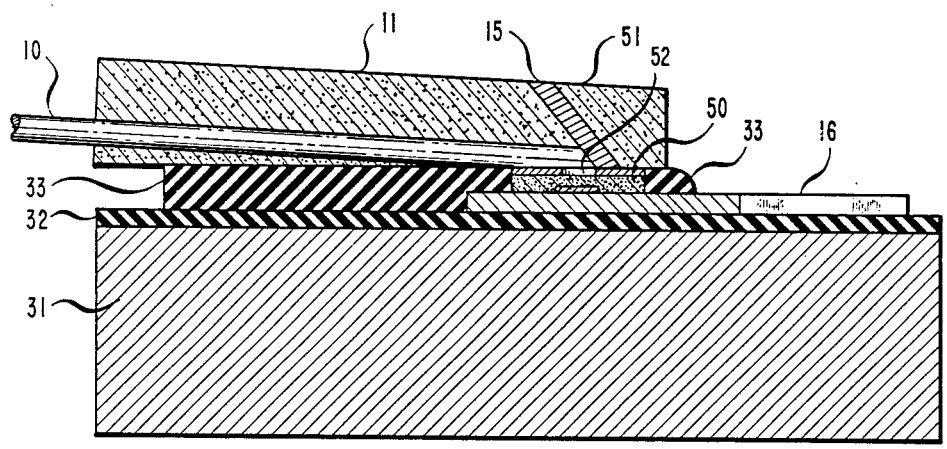
FIG. 7 is a cross-sectional, partly schematic, view of an optical component package in one stage of fabrication in accordance with yet another embodiment.
Figure 8:
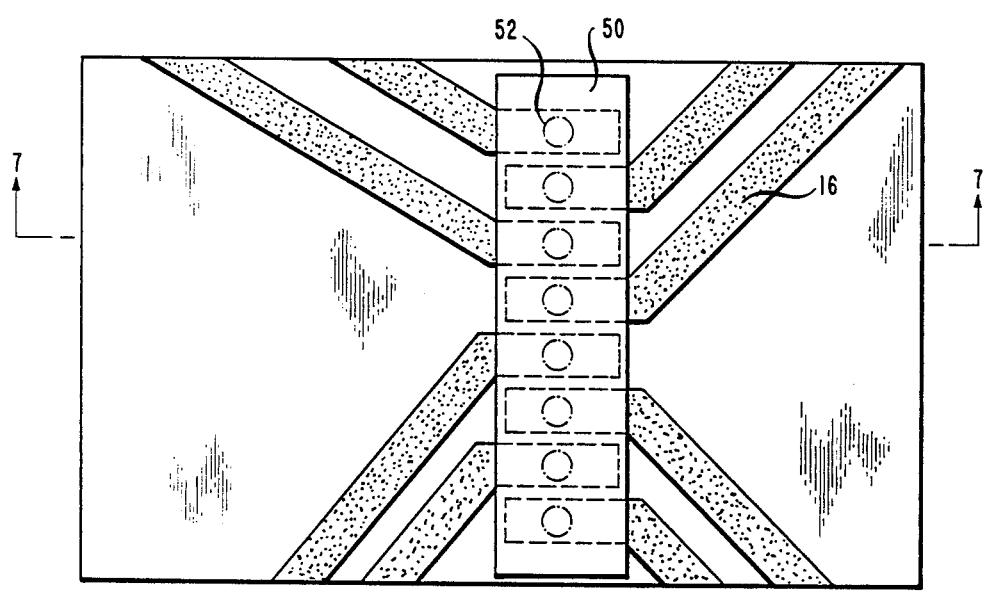
FIG. 8 is a plan view of a portion of the package of FIG. 7.

FIGS. 7 and 8 illustrate, in cross-sectional and plan schematic values, respectively, a still further embodiment of the invention which includes an array of semiconductor surface-emitting light-emitting diodes (LEDs) represented by block 50. In this particular example, the array was a double heterostructure design formed from an InP substrate and an InGaAsP layer. The actual array structure is not shown for the sake of clarity. For an example of an LED array, see, for example, Deimel et al, *Conference on Optical Fiber Communications, Technical Digest* (San Diego, Feb. 11–14, 1985), page 32. The LEDs were mounted on a heat sink, 31, such as a block of aluminum, with an oxide layer, 32, such as $Al_2O_3$, on the surface. The fanout conductors, such as 16, were deposited on the oxide layer by evaporation of titanium-platinum-gold. Alternatively, this pattern can be formed on a thin Si slice glued in turn onto the Al heat sink. The silicon block, 11 (not shown in FIG. 8), with its array of fibers, 10, and reflecting layer, 15, was then placed over the LED array 50. The fibers were aligned with their associated LEDs by applying a current to the LEDs so that light was emitted from the active regions of the LEDs represented schematically by circles such as 52. The fiber output was measured to determine when the light was optimally coupled into each fiber (by means of reflection from reflector 15). The block was then secured in place by applying an epoxy 33. In the final package, pins can be attached to the fanout conductors and the elements encapsulated by a material, such as epoxy, as in the previous embodiment. Such a package would typically measure approximately 0.30 inches in width, 0.72 inches in length and 0.25 inches in height.

Various additional modifications will become apparent to those skilled in the art. All such variations which basically rely on the teachings through which the invention has advanced the art are properly considered within the scope of the invention.

What is claimed is:

1. An optical component package comprising:
   at least one optical fiber having a longitudinal axis and mounted within a block, which block and fiber have coplanar beveled edges;
   a reflective layer formed on the beveled edges of the block and fiber; and
   at least one electro-optical component aligned with said edges so that light is reflected between the component and fiber, said component mounted over a surface which is essentially parallel to the longitudinal axis of the fiber.

2. The device according to claim 1 further comprising means for providing electrical connection to the component mounted over the same surface as the component.

3. The device according to claim 2 wherein the component and means for providing electrical connection to the component are mounted over one surface of the block.

4. The device according to claim 2 wherein the component and means for providing electrical connection to the component are mounted on the surface of a body separate from the block.

5. The device according to claim 3 wherein the component is a photoresponsive device.

6. The device according to claim 4 wherein the component is a light-emitting device and the separate body is a heat sink.

7. The device according to claim 1 wherein one surface of the block is polished at a small angle to the fiber axis so that one end of the fiber in the block is exposed where the light will be coupled between the component and the fiber.

8. The device according to claim 1 wherein the component, the reflective layer and a portion of the fiber are encapsulated within a material.

9. An optical component package comprising:
   an array of optical fibers mounted essentially in a single plane within a semiconductor block, each fiber having a longitudinal axis and each fiber and the block having coplanar beveled edges;
   a reflective layer formed on the beveled edges;
   an array of electro-optical components aligned with said edges and, mounted on a surface which is essentially parallel to but not coplanar with the longitudinal axes of the fibers; and
   means for providing electrical connection to the components mounted over the same surface as the components.

10. A package according to claim 9 wherein the means for providing electrical connection comprises a fanout array of conductors formed over the surface of the block.

* * * * *